United States Patent [19]

Crystal

[11] Patent Number: 4,798,478

[45] Date of Patent: Jan. 17, 1989

[54] SELF-ALIGNING FLUID BEARING

[75] Inventor: Kevin R. Crystal, Verona, Wis.

[73] Assignee: Nicolet Instrument Corporation, Madison, Wis.

[21] Appl. No.: 155,918

[22] Filed: Feb. 16, 1988

[51] Int. Cl.[4] ........................ F16C 32/06; F16C 23/04
[52] U.S. Cl. .......................................... 384/12; 384/38
[58] Field of Search ................... 384/7, 9, 12, 13, 38

[56] References Cited

U.S. PATENT DOCUMENTS

| 3,186,774 | 6/1965  | Wilcox        | 384/12   |
| 3,272,568 | 9/1966  | Koorneef      | 384/8    |
| 3,325,229 | 6/1967  | Webb          | 384/12   |
| 4,371,217 | 2/1983  | Turza et al.  | 384/12   |
| 4,413,863 | 11/1983 | Lombard       | 384/12 X |
| 4,413,864 | 11/1983 | Phillips      | 384/12   |
| 4,496,194 | 1/1985  | Phillips      | 384/12   |
| 4,528,704 | 7/1985  | Wegener et al.| 5/81 R   |
| 4,540,221 | 9/1985  | Frazer        | 384/12   |
| 4,542,994 | 9/1985  | Mohsin        | 384/101  |
| 4,547,081 | 10/1985 | Tanaka et al. | 384/107  |
| 4,558,909 | 12/1985 | Stauber       | 384/12   |
| 4,560,213 | 12/1985 | Enderle et al.| 384/12   |
| 4,666,315 | 5/1987  | Scranton      | 384/1    |
| 4,682,920 | 7/1987  | Rogers        | 409/231  |
| 4,686,719 | 8/1987  | Johnson et al.| 5/81 R   |

Primary Examiner—Stuart S. Levy
Assistant Examiner—Thomas R. Hannon
Attorney, Agent, or Firm—Lathrop & Clark

[57] ABSTRACT

A self-aligning fluid bearing for supporting a moving part, and allowing that part to move along at least one flat support surface substantially without friction, includes a body with at least one planar face having at least one spheroidal concave depression therein, channels within the body for directing pressurized fluid to each depression, and one planoconvex disk for each depression. Each disk includes a convex spheroidal surface with a spherical radius which is approximately equal to that of the corresponding concave depression and an oppositely facing planar surface so that the convex surface of the disk is located in spaced relation to the depression surface when pressurized fluid is directed into the depression. Each disk furthermore has a passageway between the convex surface and the planar surface through which pressurized fluid can pass to the planar surface of that disk so that the disk is supported in spaced relation to the flat support surface when pressurized fluid is directed through that passageway. Each planoconvex disk is slightly rotatable with respect to its corresponding depression so that the disks can move to compensate for imperfections in the flat support surface without upsetting the bearing. The bearing may include one or more magnets which bias the bearing toward a ferromagnetic flat support surface.

15 Claims, 3 Drawing Sheets

SELF-ALIGNING FLUID BEARING

FIELD OF THE INVENTION

This invention pertains generally to the field of frictionless bearings and particularly to those bearings which use pressurized fluid to provide a cushion of fluid which lifts the bearing from the surface upon which it levitates.

BACKGROUND OF THE INVENTION

Various types of air bearings are currently used for moving loads over flat surfaces or for allowing the frictionless rotation of the component parts of a rotary or journal type bearing to rotate with respect to each other. U.S. Pat. Nos. 4,413,864 and 4,496,194 to Phillips disclose a gas bearing which has a spherically contoured pocket with a gas supply passage which opens in the center of the spherical pocket. The gas bearing is coupled to the load and is supported by a stem and ball joint through which the gas is supplied to the bearing. An additional passage allows gas to flow between the pocket and a closed chamber in the bearing. The separate chamber within the body of the gas bearing dampens the oscillations of the gas bearing. U.S. Pat. No. 3,186,774 to Wilcox indicates that if the thickness of the air cushion between a pair of relatively moving bearing members is limited to a specific thickness at one-half of the bearing load, the fluid friction of the air cushion will exceed the vibration energy generated by the dissipation of the gas energy in flowing between the two bearing members. A hydrostatic sliding element for moving over flat surfaces by means of a fluid which fills the gap between the movable elements is disclosed in U.S. Pat. No. 4,371,217 to Turza, et al. The hydrostatic sliding element has a sliding surface which is formed by three concentric rings which extend downwardly, and grooves between the rings and within the center of the innermost ring. Pressurized fluid is pumped into one of the grooves so that it then passes under the rings to lift the hydrostatic element. The outermost ring has radial grooves through which the pressurized fluid may escape into the outside environment. The rings create resistance to the escape of the pressurized fluid which tends to maintain the sliding surface of the hydrostatic element in proper balanced spaced relationship to the element over which it hovers.

An air bearing having a circular bearing surface with multiple spiral circulation ducts and an air supply duct is disclosed in U.S. Pat. No. 4,558,909 to Stauber. The air bearing also has a central bore for coupling the bearing body to a load base. The purpose of the spiral circulation ducts is to cause the pressurized air to be uniformly circulated over the bearing surface. U.S. Pat. No. 4,560,213 to Enderle, et al. discloses a gas bearing which has a circular flexible underside membrane. A hole in the center of the membrane serves as a gas-feed opening. As the air is forced through the bearing, the membrane assumes a conical shape. A hydrostatic bearing with a cylindrical recess in which is mounted a piston-like bearing pad and valve assembly is disclosed in U.S. Pat. No. 4,540,221 to Frazer.

U.S. Pat. Nos. 4,686,719 to Johnson, et al. and 4,528,704 to Wegener, et al. show semirigid air pallet-type patient movers which float on a cushion of air supplied by air escaping through small perforations. Rotary or journal-type fluid bearings are disclosed in U.S. Pat. Nos. 4,547,081 to Tanaka, et al., 4,542,994 to Mohsin, and 4,682,920 to Rogers. An oscillating pneumatodynamic bearing is disclosed in U.S. Pat. No. 4,666,315 to Scranton.

U.S. Pat. No. 3,272,568 to Koorneef, et al. discloses using magnets for urging the bearing surface toward a guide member over which the bearing surface is maintained in spaced relation.

Fluid bearings which move over flat support surfaces generally require a support surface which is stringently planar. If the air bearing surface which hovers over the support surface encounters an obstacle or a curved portion of the support surface, the air bearing surface is forced to rotate, thereby causing the entire air bearing to rotate and lose its parallel spaced relationship with the rest of the support surface. Such rotational action may destabilize the bearing. Portions of the air bearing surface may come into contact with the support surface, negating the substantially frictionless property of the bearing system.

SUMMARY OF THE INVENTION

The self-aligning fluid bearing in accordance with the present invention is used for supporting a moving part and allowing that part to move along at least one flat support surface with substantially no friction. The self-aligning fluid bearing includes a body which has at least one face which is substantially planar with at least one spherical concave depression therein, means within the body for directing pressurized fluid to each depression, and one planoconvex disk for each depression. Each planoconvex disk includes a convex spheroidal surface of spherical radius approximately equal to that of the corresponding concave depression and an oppositely facing planar surface which joins the convex surface along a circular margin therebetween. Each disk has at least one first passageway between the convex surface and the planar surface through which pressurized fluid can pass. Pressurized fluid is directed into each depression so that the disk is suspended largely within the corresponding depression between and in spaced relation to the flat support surface. Thus, the concave depression surface and convex surface form therebetween a second passageway through which pressurized fluid can pass from the depression to the environment outside of the bearing, and the planar surface on the disk forms with the flat support surface a third passageway through which the pressurized fluid can pass from the first passageway to the outside environment.

The fluid directing means may comprise first interior surfaces within the body which form at least one constricted channel, wherein each constricted channel extends from one concave depression into the body to regulate the rate of fluid flow into each depression. The fluid directing means furthermore may include second interior surfaces which form at least one large channel which directs pressurized fluid from an inlet to the constricted channels.

The number of depressions and paired planoconvex disks on the self-aligning fluid bearing is determined by the desired number of degrees of freedom for the particular bearing. An object which is unrestrained has three rotational degrees of freedom and three linear translational degrees of freedom. Each depression and paired disk which is added to a bearing restrains one degree of freedom. Therefore, if a first planar surface on the bearing has three (or more) concave depressions with three planoconvex disks, the bearing will have one rotational degree of freedom and two linear translational degrees of freedom for a total of three degrees of freedom.

A magnet may be placed within a recess formed in a planar surface on the bearing with its magnetic polar axis perpendicular to a ferromagnetic flat support surface so that the magnet biases the bearing to move toward the support surface. The magnet acts to restrain the bearing from moving away from the flat support surface, and increases the stiffness of the bearing in a direction normal to the surface.

The self-aligning fluid bearing in accordance with the present invention is simple in design and includes a minimum of moving parts. The only parts which are movable are the planoconvex disks which may rotate slightly to compensate for flaws in the flat support surface. Thus, use of the self-aligning fluid bearing does not require a support surface which is perfectly planar. Each disk has the freedom to rotate in any of three directions to compensate for curved portions of the nominally flat support surface. The provision of the constricted channels in combination with the large supply channels or manifold for directing pressurized fluid through the constricted channels to the depressions ensures that the pressure drop within the large channels is negligible. Therefore, any rapid variation in fluid flow into the bearing is relatively unnoticeable in the operation of the bearing. In addition, the pressurized fluid flow to each of the depressions is substantially equal.

Further objects, features, and advantages of the invention will be apparent from the following detailed description when taken in conjunction with the accompanying drawings.

DESCRIPTION OF THE PREFERRED EMBODIMENTS

Figure 1:
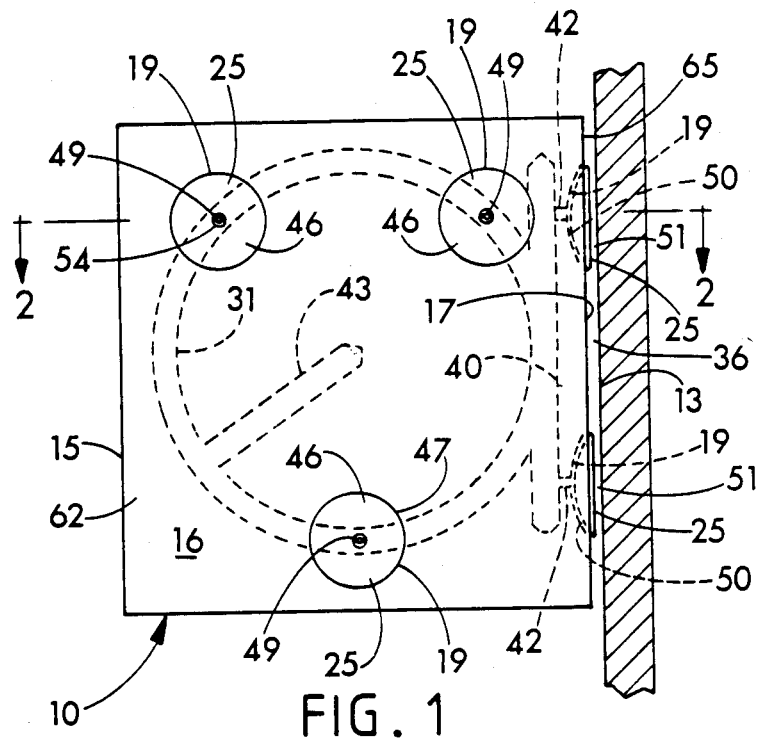
FIG. 1 is a bottom view of a first preferred self-aligning fluid bearing in accordance with the present invention placed against a restraining flat support surface to one side of the bearing, showing the large channels of the manifold in dashed lines.

Referring to the drawings, FIG. 1 shows a bottom view of a first preferred self-aligning fluid bearing 10 in accordance with the invention, which is used for supporting a moving part and allowing that part to move over a flat surface with substantially no friction. The bearing 10 is connected to a source of pressurized air so that the bearing floats on a cushion of air between the surfaces of the bearing and the flat support surfaces 12 and 13.

Figure 2:
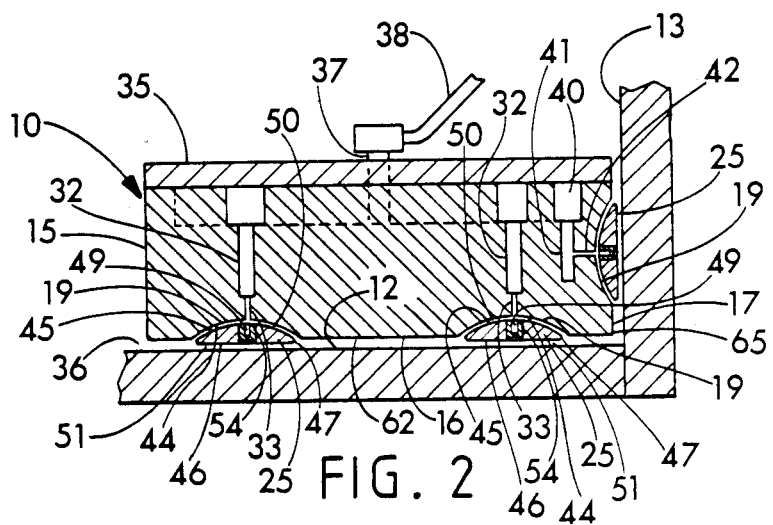
FIG. 2 is a cross-sectional view taken along section line 2—2 of FIG. 1.
Figure 5:
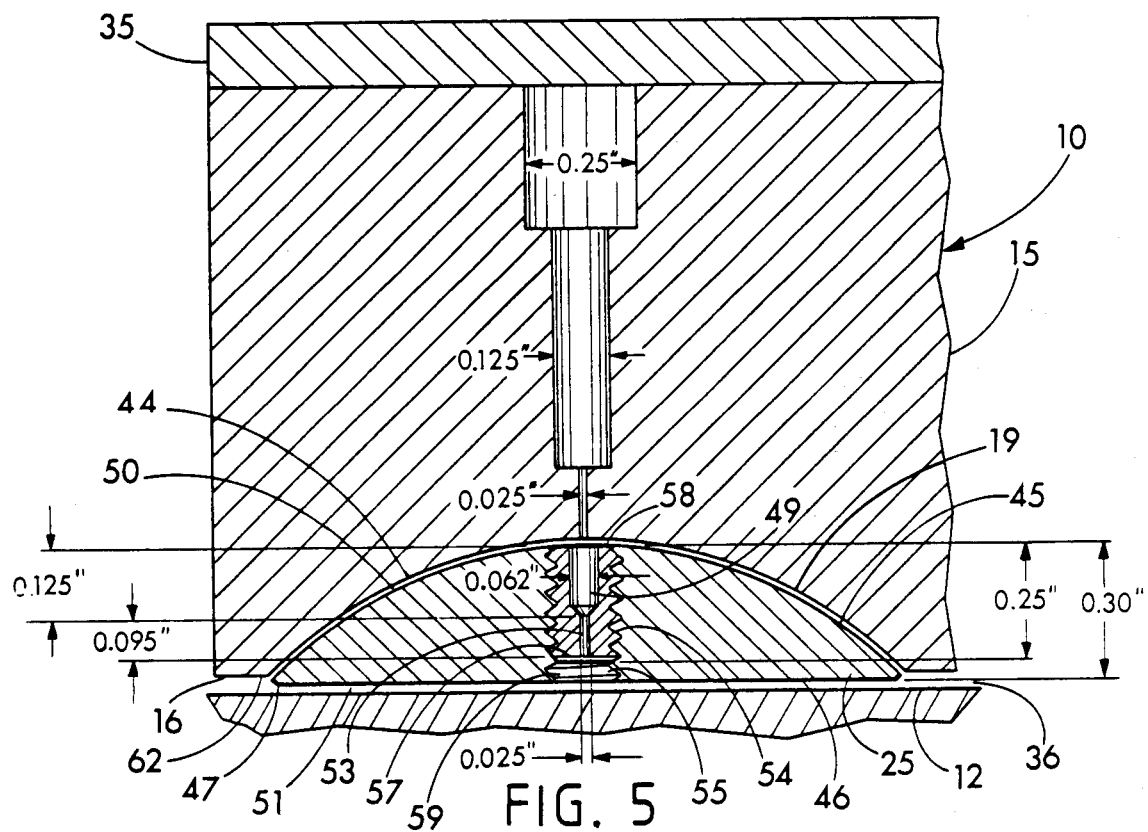
FIG. 5 is an enlarged view of a portion of FIG. 2 showing a single depression and its corresponding planoconvex disk in section.

The first preferred bearing 10 includes a body 15 with a first face 16 and a second face 17 with five spheroidal concave depressions 19 formed in the two faces 16 and 17, planoconvex disks 25 which substantially fit into each of the depressions 19, and means within the body 15 for directing pressurized fluid to each depression. FIG. 5 shows an enlarged partial section view of the bearing 10 which shows one depression 19 and its corresponding disk 25. The large manifold channels 31 and 32 and the constricted channel 33 together form the means within the body 15 for directing pressurized fluid to the depressions 19 on the bottom face. The connecting channels 41 and constricted channels 42 also shown in FIGS. 1 and 2 are essentially the same as the connecting channel 32 and constricted channel 33 shown in FIG. 5. As shown in FIG. 2, the body 15 of the fluid bearing 10 furthermore includes a manifold cover 35 which seals off the large manifold channels 31 from the outside environment 36 of the bearing 10, and furthermore includes an inlet 37 to which a hose 38 can be connected to supply the bearing 10 with pressurized fluid, preferably air at a pressure of about 5–40 p.s.i. at the inlet 37.

A means within the body 15 for directing pressurized fluid to each depression 19 in the first preferred bearing 10 includes the several interconnected large channels 31, 32, 40, 41, and 43 and also five constricted channels 33 and 42. The constricted channels 33 and 42 are formed by first interior surfaces within the bearing body 15. As shown in FIGS. 1 and 2, the large channels 31, 32, 40, 41 and 43 are formed by second interior surfaces within the body 15 which define the large radial channel 43, the large circular channel 31 and the connecting channels 32 and 41. The radial channel 43 forms a pathway for pressurized fluid to flow from the inlet 37 to the circular channel 31 and to a large longitudinal channel 40. The connecting channels 32 and 41 each form a pathway from either the circular channel 31 or the longitudinal channel 40 to a constricted channel 33 or 42. Each constricted channel 33 or 42 extends from one concave depression 19 into the bearing body 15 to regulate the rate of fluid flow to each depression 25 from the large channels 31, 32, 40, 41, and 43. The large channels 31, 32, 40, 41, and 43 are interconnected with each other to direct pressurized fluid from the inlet 37 to the constricted channels 33 and 42. The large channels 31, 32, 40, 41, and 43 in combination with the constricted channels 33 and 42, dampen any effects of rapid variations in fluid pressure on operation of the bearing 10 and provide fluid to all of the depressions 19 at an approximately equal pressure. They also ensure that there will be substantially equal, controllable pressure at the inlets to all the constricted channels 33 and 42. Thus the constricted channels 33 and 42 serve effectively to regulate the amount of fluid flow to the depressions 19.

As shown in FIGS. 1 and 2, the first planar face 16 of the body 15 has three spherical concave depressions 19 which are each located below the circular channel 31 and are connected thereto by the connecting channels 32 and constricted channels 33. The second planar face 17 on the body 15 has two spherical concave depressions 19 which are located downwardly from and to a side of the large longitudinal channel 40 and which are connected thereto by the connecting channels 41 and the constricted channels 42.

Figure 6:
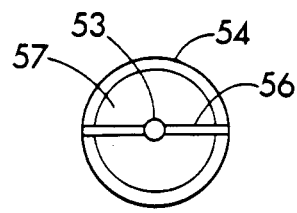
FIG. 6 is a bottom view of the screw insert shown in FIG. 5.
Figure 7:
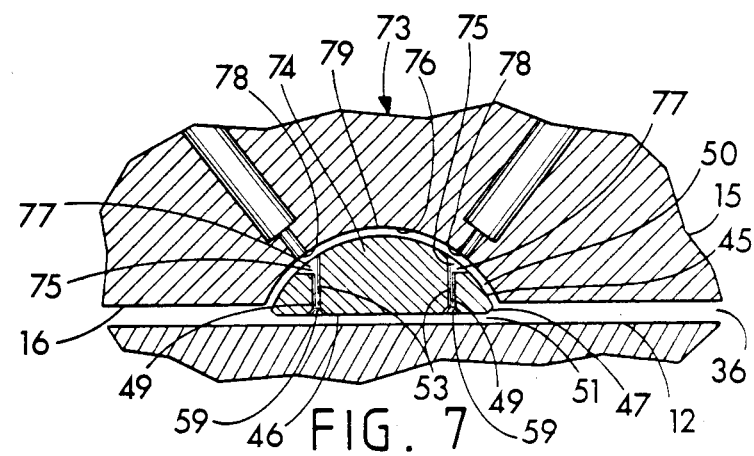
FIG. 7 is a partial cross-sectional view similar to that shown in FIG. 5, showing a second preferred self-aligning fluid bearing.
Figure 8:
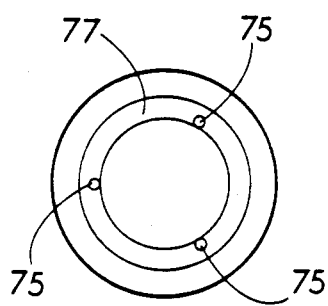
FIG. 8 is a top view of the planoconvex disk of FIG. 7.

A corresponding planoconvex disk 25 fits into each depression 19 and includes a convex spheroidal surface 45 with a spherical radius which is approximately equal to that of the corresponding concave depression 19, and an oppositely facing planar surface 46. The spherical radius of the depression surface 44 and convex surface 45 of the disk 25 shown in FIG. 5 is about one inch. This dimension, of course, may be selected as desired to suit specific applications of the invention. The spherical radius of the convex spheroidal surface 45 might be slightly smaller than that of its corresponding depression 19, so that the spheroidal surface 45 is concentric with the depression surface 44. The convex surface 45 and planar surface 46 of each disk 25 join along a circular margin 47 which is beveled. The beveling on the circular margin 47 allows the disk 25 to move more easily over obstacles which the disk 25 encounters on the flat support surfaces 12 or 13. Each disk 25 in the first preferred bearing 10 has one first passageway 49 which extends between the convex surface 45 and the planar surface 46. The first passageway 49 allows pressurized fluid to pass from the convex surface 45 to the planar surface 46 of the disk 25. Thus, when pressurized fluid passes through the constricted channels 33 or 42, each disk 25 is suspended largely within the corresponding depression 19 between and in spaced relation to the corresponding depression surface 44 and to the adjacent flat support surface 12 or 13. The concave depression surface 44 and convex surfaces 45 of the disks 25 form therebetween a second passageway 50 through which pressurized fluid can pass from the depression 19 to the outside environment 36, thereby causing the convex surfaces 45 to be in cushioned spaced relation to the corresponding depression surfaces 44. As the disks 25 float over the adjacent flat support surface 12 or 13, the planar surfaces 46 on the disks 25 along with the adjacent flat surface 12 or 13 form a third passageway 51 therebetween through which the pressurized fluid passes from the first passageway 49 through the disk 25 to the outside environment 36. The first passageway 49 of each disk 25 has a constricted portion 53 which regulates the rate of fluid flow from the convex surface 45 to the planar surface 46 of the disk 25. As is best shown in FIG. 5, the constricted portion 53 of the first passageway 49 in the first preferred bearing 10 is formed by the screw insert 54 which is screwed into a 10-32 UNF-2A threaded tap hole 55. As shown in FIG. 6, the screw insert 54 has a slot 56 in its bottom 57 for receiving a screwdriver blade. The insert 54 is screwed into the tap hole 55 so that its top 58 is almost flush with the convex spheroidal surface 54. The insert 54 therefore does not fill the entire length of the tap hole 55, so that the first passageway 49 is countersunken at 59 where it opens on the planar surface 46 of the disk 25. The disk 25 need not include a countersunken portion 59. Although the first passageways 49 in FIGS. 1, 2 and 5 are formed using the insert 54, alternatively the first passageway could be formed directly in the disk 25, as shown in FIGS. 9-12 at 49 also. FIGS. 7 and 8 show a disk 74 with three first passageways 49 formed directly in the material of the disk 74.

In the embodiments shown in FIGS. 1-2, 5, 11, and 12, each disk 25 has one first passageway 49 which is aligned with a central axis of the disk 25, and each constricted channel 33 or 42 is aligned with a central axis of its corresponding spheroidal concave depression 19 so that the first passageway 49 of each disk 25 is aligned with the corresponding constricted channel 33 or 42 when the disk 25 is at least nearly centered within the depression 19. Even if the disk 25 rotates slightly in any of its three directions of rotational freedom, pressurized fluid will pass from the constricted channels 33 or 42 into the first, second and third passageways 49, 50 and 51, and thus keep the disk 25 and body 15 afloat. Thus to some extent, each disk 25 has three rotational degrees of freedom which allow the disk 25 to move over a flat support surface 12 or 13 which is not perfectly planar. As the disk 25 moves over the surface 12 or 13 and encounters obstacles or curved portions of the surface 12 or 13, the disk 25 rotates slightly to pass over the obstacles or curved portion of the flat surface 12 or 13 while the bearing body 15 itself remains relatively stable After passing over the obstacle or curved portion of the flat surface 12 or 13, the disk 25 returns to its centered position, which is shown best in FIG. 5.

Figure 3:
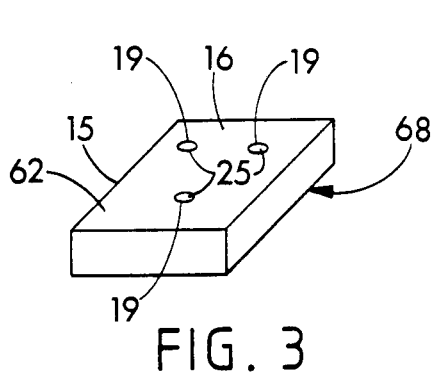
FIG. 3 is a schematic perspective diagram showing the bottom and sides of a bearing which is similar to that shown in FIG. 1, but which has one planar face with three spheroidal concave depressions and three planoconvex disks to allow three degrees of freedom.
Figure 4:
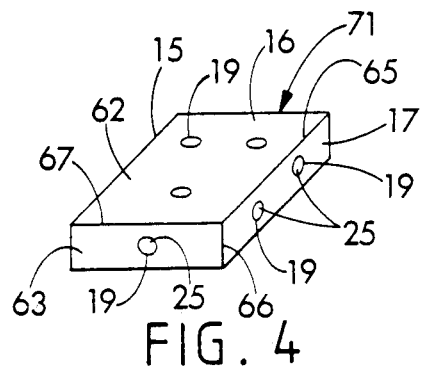
FIG. 4 is a schematic perspective diagram showing the bottom and sides of a bearing which is similar to that shown in FIG. 1, but which has three planar faces with six spheroidal concave depressions and six planoconvex disks to allow zero degrees of freedom.

In the embodiment shown in FIGS. 1 and 2, there are two planar faces 16 and 17 on the bearing 10 which define planes which intersect along a line 65. As described above, the first face has three spheroidal concave depressions 19 and there are three corresponding planoconvex disks 25 which together determine a plane. The second face 17 has two spheroidal concave depressions 19 with two corresponding planoconvex disks 25. Thus the bearing 10 shown in FIGS. 1 and 2 has zero rotational degrees of freedom and one linear translational degree of freedom in that the bearing 10 can move in a linear direction which is parallel to both flat supportive surfaces 12 and 13. Alternatively, the bearing could have just the first planar face 16 with the three spheroidal concave depressions 19, and the corresponding planoconvex disks 25 which together determine a plane such that the bearing has one rotational degree of freedom and two linear translational degrees of freedom for a total of three degrees of freedom. Such an alternative bearing 68 is shown schematically in FIG. 3, viewing the bottom 62 and sides of the bearing 68. Another alternative bearing 71, which is shown schematically in FIG. 4, has three planar faces 16, 17 and 63 which are non-coplanar and which define planes which intersect along three intersecting lines 65-67. The first and second planar faces 16 and 17 may be substantially identical to those shown in FIGS. 1 and 2, and the third planar face 63 may have one spheroidal concave depression 19 with one corresponding planoconvex disk 25, so that the bearing 71 has zero degrees of freedom at a corner where two side support surfaces meet, but one degree of freedom (in two perpendicular directions) away from the corner. An unrestrained object has six degrees of freedom - three rotational degrees of freedom and three linear dimensional degrees of freedom. In the embodiment and alternatives shown in FIGS. 1-4, each paired depression 19 and disk 25 constrains one degree of freedom. Therefore, any bearing should have a number of pairs of planoconvex disks 25 and depressions 19 which is equal to the number of degrees of freedom to be constrained. Generally, each planoconvex disk - depression pair should be placed on a bearing planar face where it will not be redundant. An example of redundancy would be placing four pairs on one planar face.

The body 15 consists of a plate or block of easily machined or formed material which can be treated to obtain a hard surface, such as anodized aluminum or hardened or plated steel. Similarly, the planoconvex disks 25 are made from an easily machined or formed material which can be treated to obtain a hard surface, such as anodized aluminum or hardened or plated steel. Certain lapping techniques may be followed to obtain an accurate spherical surface in the depressions 19 and on the convex spheroidal surface 45 of the disks 25. After the disks 25 and depressions 19 have been ground, molded, or otherwise formed, a lapping compound such as silicon carbide grease may be applied to one of the planoconvex disks 25 which is then placed into contact with one of the concave depressions 19 in the body 15. The planoconvex disk 25 is then rotated and mutated until the depression surface 44 and the convex surface 45 of the disk 25 have been completely lapped. This technique should be followed with each disk and its corresponding depression. Common techniques of lapping should be observed to obtain good results. The last grit used should leave a surface finish appropriate for the fluid bearing. The depression 19 and convex surface 45 of the disk 25 might then be finished by anodizing or plating or by using any other suitable form of finishing, and then lapped again with a fine grit if necessary.

In its operation, the first preferred bearing 10 is utilized to support a moving part to which the bearing 10 is attached or formed as a part thereof, to allow that part to move along at least one flat support surface with substantially no friction. When a pressurized fluid such as air is pumped into the inlet 37, the pressurized fluid moves through the radial channel 43 into the circular channel 31 and longitudinal channel 40, and then into the connecting channels 32 and 41. These large channels 31, 32, 40, 41, and 43 are relatively large compared to the constricted channels 33 and 42. Relatively little pressure drop will occur in the large channels as compared with the pressure drop in the small channels, so that the pressure at all joints in the large channels will be substantially the same. As a result, each disk 25 will ride within a surrounding cushion of pressurized fluid between the corresponding depression surface 44 and the adjacent flat support surface 12 or 13. The pressurized fluid will eventually escape out from the bearing 10 into the outside environment 36 through the second and third passageways 50 and 51.

A second preferred self-aligning fluid bearing 73 is shown in cross-section in FIG. 7. The second bearing 73 is similar to that shown in FIGS. 1-6 except that there are more than one of the passageways 49 in each disk, so that the means within the body 15 for directing pressurized fluid to each depression is different than that shown in FIGS. 1-2. FIG. 8 shows a planoconvex disk 74, viewing the disk 74 from above its convex spheroidal surface 45. As shown in FIGS. 7 and 8, the disk 74 has three first passageways 49 which each have first openings 75 on the convex surface 45 which are equidistant a select distance from the central axis of the disk 74. The convex surface 45 has formed in it a circular groove 77 which is concentric with respect to the central axis of the disk 74 and which adjoins the first passageways' first openings 75. The constricted channels 33 and their second openings 78 into the depression 79 also are equidistant the select distance from a central axis of the depression 79 so that the constricted channels 33 are aligned with the circular groove 77 when the disk 74 is at least nearly centered within the depression 79. As a result, some of the pressurized fluid which flows from the constricted channels 33 into the depression 79 will be directed through the groove 77 to the first passageways 49 when the first and second openings 75 and 78 are not aligned. Of course, some pressurized fluid may still pass through the second passageway 50 to the first passageways 49. Alternatively, the disk 74 could have even more first passageways 49. However, such first passageways 49 would preferably be connected by a groove which is concentrically located a selected distance from the central axis of the disk 74 which is the same distance that the constricted channels 33 are located from the central axis of the depression 79. As shown in FIG. 7, the connecting channels 32 within the body 15 would have to be relocated to adapt to the position of the constricted channels 33 and first passageways 49.

The second preferred bearing 73 operates in a similar fashion as that shown in FIGS. 1-6. However, the pressurized fluid which passes through the connecting channels 32 and constricted channels 33 to the depression, 79, may also pass through the circular groove 77 before passing through three first passageways 49 to the third passageway 51 between the planar surface 46 of the disk 74 and the flat support surface 12. Of course, some of the pressurized fluid which flows into the depression 79 from the constricted channels 33 passes through the second passageway 50 between the convex spheroidal surface 45 of the disk 74 and the depression surface 76 to the outside environment 36.

Figure 9:
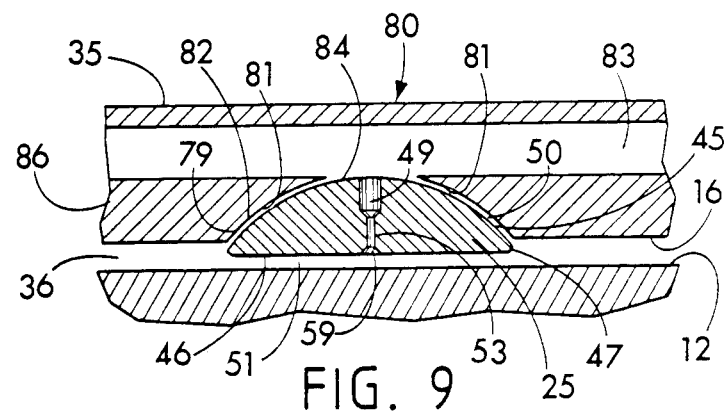
FIG. 9 is a partial cross-sectional view similar to that of FIG. 5, showing a third preferred self-aligning fluid bearing.

FIG. 9 shows a third preferred self-aligning fluid bearing 80 in which the means within the body 86 for directing pressurized fluid to each depression 82 varies considerably from that shown in FIGS. 1-2, 5, and 7. The fluid directing means comprises interior surfaces within the body 86 which form a large chamber 83 having an opening 84 into each spheroidal concave depression 82 around the central axis of the depression 82. The disk 25 may be the same as those shown in FIGS. 1-2, 5, or 11 and 12. Preferably, the planoconvex disk 25 would have a first passageway 49 which is aligned with the central axis of the disk 25. Therefore, when the disk 25 is centered within the depression 82, the opening 84 from the large chamber 83 is directly aligned with the first passageway 49 to allow pressurized fluid to pass from the chamber 83 into the first passageway 49. Pressurized fluid passes from the first passageway 49 to the third passageway 51 as in other embodiments. In addition, pressurized fluid passes from the chamber 83 through the opening 84 directly into the second passageway 50 between the depression surface 81 and the convex spheroidal surface 45 of the disk 25. The flotation of the disk 25 within the depression 82 in spaced relation to both the depression surface 81 and the flat support surface 12 is therefore quite similar to other embodiments. In the third preferred bearing 80, however, the large chamber 83 ensures that the flow of fluid to each of the depressions 82 is equal, and furthermore dampens the effect of any rapid variations in fluid pressure delivered to the bearing 80. The body 86 includes a manifold cover 35 which seals off the large chamber 83 from the outside environment 36. Pressurized fluid could be delivered to the large chamber 83 through an inlet which is similar to that shown in FIG. 2.

Figure 10:
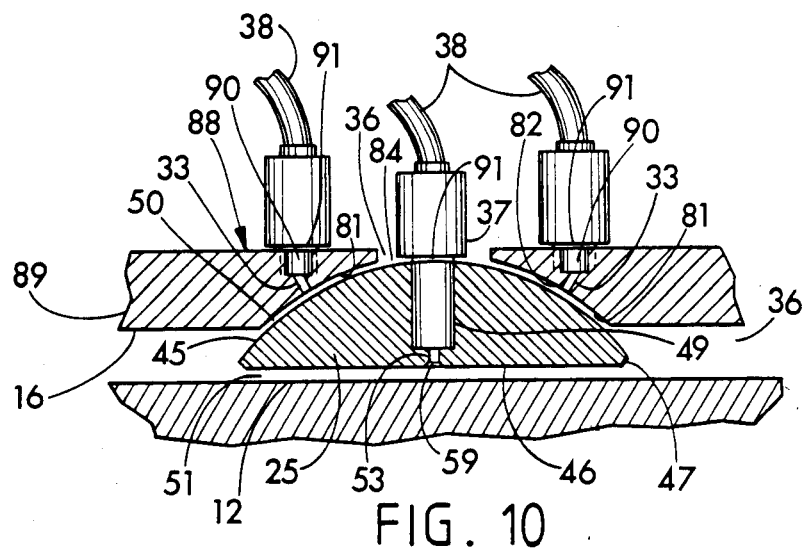
FIG. 10 is a partial cross-sectional view similar to that shown in FIG. 5, showing a fourth preferred self-aligning fluid bearing.

A fourth preferred self-aligning fluid bearing 88 is shown in FIG. 10. The fourth preferred bearing 88 has some similarities with those shown in FIGS. 8 and 9, except that a hose 38 which supplies pressurized air is connected directly to the first passageway 49 of the disk 25 through the opening 84, and therefore no chamber 83 is necessary. In addition, there are two constricted channels 33 which extend from the depression 82 into the body 89 of the bearing 88 to individual large channels 90 which are directly connected to two additional hoses 38. The opening 84 must be large enough to allow the hose connection 91 some freedom of motion as the disk 25 moves over the flat support surface 12. As shown in FIG. 10, the opening 84 opens from the depression 82 into the outside environment 36. Therefore, air which is pumped from the large channels 90 and constricted channels 33 into the depression 82 will flow through the second passageway 50 in two directions to the outside environment 36, both toward the planar face 16 of the bearing 88 and toward the opening 84. Pressurized fluid, of course, will also move through the first passageway 49 to the third passageway 51 to allow the disk 85 to hover over the flat support surface 12. Thus the fourth preferred bearing 88 will function in a similar manner as the other embodiments, except that its pressurized fluid is supplied in a different manner.

Figure 11:
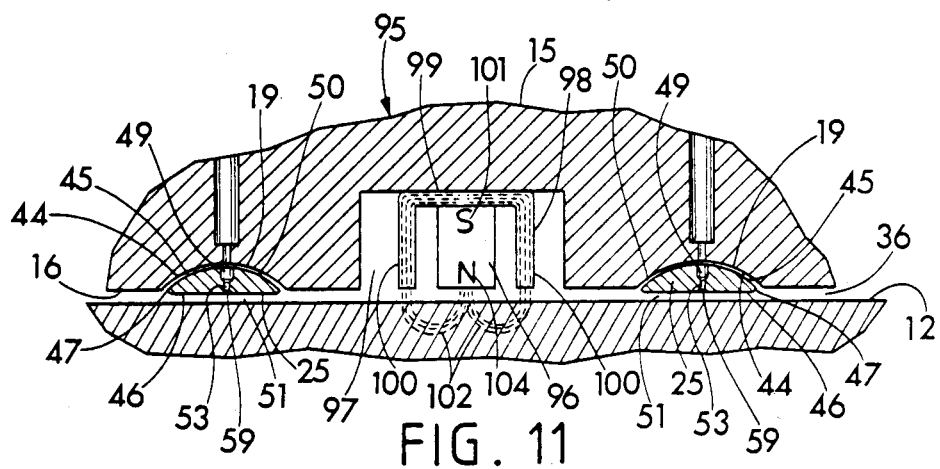
FIG. 11 is a partial cross-sectional view similar to that shown in FIG. 5, showing a fifth preferred self-aligning fluid bearing with a magnet for biasing the bearing against a ferromagnetic flat support surface.

A fifth preferred self-aligning fluid bearing 95 is shown in FIG. 11. The fifth preferred bearing 95 as shown is similar to those shown in the other Figures, particularly FIGS. 1-5, except that the bearing 95 includes a magnet 96 which provides a magnetic force which biases the bearing planar face 16 toward a ferromagnetic flat support surface 12. As shown in FIG. 11, the planar face 16 has a recess 97 in which the magnet 96 is positioned to pull the body 15 of the bearing 95 toward the flat surface 12. The polar axis of the magnet 96 therefore is substantially perpendicular to the planar face 16 of the body 15, and to the support surface 12. The bearing 95 furthermore includes a channel-shaped ferromagnetic field guide 98 which includes a central portion 99 which is attached to the bearing body 15 on one side and on the other side to the magnet 96. The guide 98 includes the central portion 99 and legs 100 which are joined to and extend outwardly from edges of the central portion 99. The central portion 99 is connected to the pole 101 of the magnet 96 which is rearmost within the recess 97, in this example, the south pole. The legs 100 extend outwardly substantially parallel to the polar axis of the magnet 96, and in spaced relation to the magnet 96 to provide a concentrated path of least reluctance along which the magnetic field of the magnet 96 is directed and confined as shown in FIG. 11 by the field lines 102. The fifth preferred bearing 95 operates in a similar fashion as do the other bearings, except that the magnet 96 biases the body 15 toward the support surface 12 so that the bearing body 15 is not likely to move substantially away from the support surface 12. This may be particularly useful if it is found that gravitational force is not sufficient for holding the body 15 to the particular support surface 12.

Figure 12:
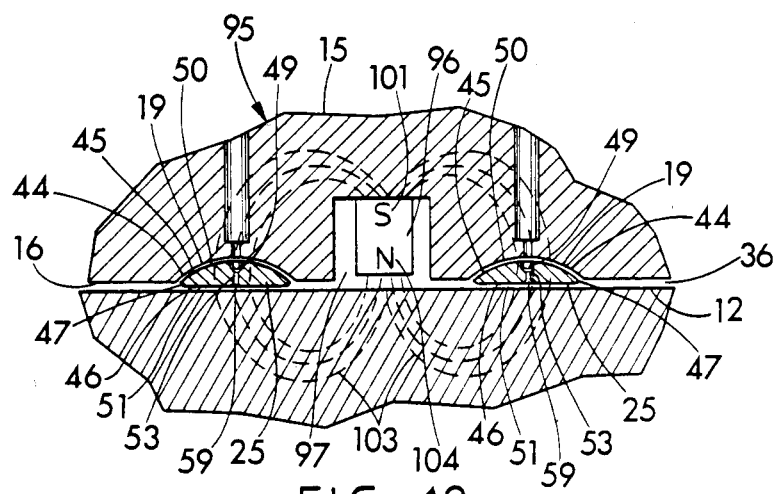
FIG. 12 is a partial cross-sectional view similar to FIG. 5, showing an alternative embodiment of the fifth preferred self-aligning fluid bearing of FIG. 11, wherein the magnetic field lines pass through the planoconvex disks instead of through a channel shaped guide.

As shown in FIG. 12, the fifth preferred bearing 95 alternatively may include no guide 98, but can instead have the depressions 82 and disks 25 positioned close enough to the recess 97 and magnet 96 so that the magnetic field lines 103 pass through the bearing body 15 to ferromagnetic disks 25 and then through the ferromagnetic flat support surface 12 back to the opposite pole 104 of the magnet 96. As shown in FIG. 12, the body 15 of this alternative embodiment of the fifth preferred bearing 95, between where the magnet 96 is attached to the recess 97 and the disks 25 are located, should be formed of a ferromagnetic material to decrease reluctance. As shown, the planar face 16 has two spheroidal concave depressions 19 which are symmetrically located with respect to the polar axis of the magnet 96. The planoconvex disks 25 are largely positioned within the depressions 19 to provide pathways of least reluctance through the disks 25 to the ferromagnetic flat support surface 12 for the magnetic field of the magnet 96, as shown by the field lines 103 in FIG. 12. This alternative embodiment of the fifth preferred bearing 95 operates similarly to the bearing 95 shown in FIG. 11, except that the field lines 103 pass through the ferromagnetic disks 25 instead of through the ferromagnetic channel-shaped field guide 98. Although the particular embodiments shown in FIGS. 11-12 with which the biasing magnets 96 are used are similar to those shown in FIGS. 1-5, the magnets 96 could be similarly utilized with the embodiments shown in the other Figures as well. Electromagnets, of course, could be used in the place of the magnets 96. Additionally, a magnet 96 could be used on a face 16 with one or three depressions 19 and corresponding disks 25. Instead of using magnets, other methods of constraining the bearing toward a flat support surface could be used such as vacuum systems, and restraining arms.

It is understood that the invention is not confined to the particular construction and arrangements herein illustrated and described but embraces such modified forms thereof as come within the scope of the following claims.

What is claimed is:

1. A self-aligning fluid bearing for supporting a moving part and allowing that part to move along at least one flat support surface substantially without friction comprising:
   (a) a body including at least one face which is substantially planar and having at least one spheroidal concave depression therein;
   (b) means within the body for directing pressurized fluid to each depression;
   (c) one planoconvex disk for each depression, each disk including a convex spheroidal surface with a spherical radius which is approximately equal to that of the corresponding concave depression, and an oppositely facing planar surface, the disk having at least one first passageway between the convex surface and the planar surface through which pressurized fluid can pass and being suspended within a cushion of fluid while located largely within the corresponding depression between and in spaced relation to a surface of the depression and to the flat support surface, the concave depression surface and convex surface forming therebetween a second passageway through which pressurized fluid can pass to an outside environment, and the planar surface on the disk forming with the flat support surface a third passageway therebetween through which the pressurized fluid can pass from the first passageway to the outside environment.

2. The bearing of claim 1 wherein the fluid directing means comprises first interior surfaces within the body which form at least one constricted channel, each constricted channel extending from one concave depression into the body to regulate the rate of fluid flow to each depression; and second interior surfaces which form at least one large channel which directs pressurized fluid from an inlet to the constricted channels, the large channels in combination with the constricted channels dampening any effects of rapid variations in fluid pressure at the inlet on operation of the bearing and providing fluid to the depressions at approximately equal pressures.

3. The bearing of claim 2 wherein there is one first passageway in each disk which is aligned with a central axis of the disk, and each constricted channel is aligned with a central axis of its corresponding concave depression so that the first passageway of each disk is aligned with the corresponding constricted channel when the disk is nearly centered within the depression.

4. The bearing of claim 2 wherein there are a plurality of first passageways in each disk, the first passageways having first openings on the convex surface which are equidistant a select distance from a central axis of the disk, the convex surface having formed in it a circular groove which is concentric with respect to the central axis of the disk and which adjoins the first passageway openings, and wherein there are a plurality of constricted channels connecting to each depression, the constricted channels having second openings into the depression which are located equidistantly the selected distance from a central axis of the depression so that the constricted channels are aligned with the circular groove when the disk is nearly centered within the depression so that some of the pressurized fluid can be directed from the constricted channels through the groove to the first passageways when the first and second openings are not aligned, in addition to that pressurized fluid which may pass through the second passageway to the first passageways.

5. The bearing of claim 2 wherein the bearing body has a hole which opens into at least one of the spheroidal concave depressions at and around the central axis of the depression and which extends entirely through the body so that a hose can be connected through the hole directly to the first passageway within the corresponding disk to deliver pressurized fluid to the first and third passageways.

6. The bearing of claim 1 wherein each first passageway within the disks has constricted portion which regulates the rate of fluid flow from the convex surface to the planar surface of the disk.

7. The bearing of claim 1 wherein the first passageways are countersunken where they open on the planar surface of the disk.

8. The bearing of claim 1 wherein each disk is beveled along a circular margin where the planar surface and convex surface are adjoined.

9. The bearing of claim 1 wherein there is one planar face on the bearing with three spheroidal concave depressions, each with a corresponding planoconvex disk, the three disks determining a plane so that the bearing has one rotational degree of freedom and two translational degrees of freedom.

10. The bearing of claim 1 wherein there are two planar faces on the bearing which define planes which intersect along a line, a first planar face with three spheroidal concave depressions and three corresponding planoconvex disks which determine a plane; and a second planar face with two spheroidal concave depressions and two corresponding planoconvex disks, so that the bearing has zero rotational degrees of freedom and one translational degrees of freedom.

11. The bearing of claim 1 wherein there are three planar faces on the bearing which are non-coplanar and which define planes which intersect along three intersecting lines, the planar faces including a first planar face with spheroidal concave depressions and three corresponding planoconvex disks which determine a plane; a second planar face with two spheroidal concave depressions and two corresponding planoconvex disks, and a third planar face with one spheroidal concave depression and one corresponding planoconvex disk.

12. The bearing of claim 1 wherein at least one of the planar faces has a recess and the bearing further includes a magnet which is positioned within the recess with its polar axis substantially perpendicular to said planar face, the magnet providing a magnetic force which biases the bearing toward ferromagnetic flat support surfaces.

13. The bearing of claim 12 further including a channel-shaped ferromagnetic field guide including a central portion and legs which are joined to and extend outwardly from edges of the central portion, the central portion being adjacent to a pole of the magnet which is rearmost in the recess, the legs extending outwardly substantially parallel to the polar axis and in spaced relation to the magnet to provide a concentrated path of least reluctance along which a magnetic field of the magnet is directed and confined.

14. The bearing of claim 12 wherein at least a portion of the bearing body is ferromagnetic, and the planar face having the recess has at least two spheroidal concave depressions with corresponding ferromagnetic planoconvex disks, the depressions being located symmetrically with respect to the polar axis and positioned to provide pathways of least reluctance through the disks to a ferromagnetic flat support surface for a magnetic field of the magnet.

15. The bearing of claim 1 wherein the fluid directing means comprises interior surfaces within the body which form a large chamber having an opening which opens into at least one of the spheroidal concave depressions at and around the central axis of the depression.

* * * * *